United States Patent
Park

(10) Patent No.: US 10,365,689 B2
(45) Date of Patent: Jul. 30, 2019

(54) TRANSPARENT COVER FOR ELECTRONIC DEVICE

(71) Applicants: SAMWON ST, Cheongju-si (KR); ELK CORPORATION, Daejeon (KR)

(72) Inventor: Chul Park, Gyeonggi-do (KR)

(73) Assignees: ELK CORPORATION (KR); SAMWON ST (KR)

( * ) Notice: Subject to any disclaimer, the term of this patent is extended or adjusted under 35 U.S.C. 154(b) by 120 days.

(21) Appl. No.: 15/117,085

(22) PCT Filed: Feb. 5, 2015

(86) PCT No.: PCT/KR2015/001182
§ 371 (c)(1),
(2) Date: Aug. 5, 2016

(87) PCT Pub. No.: WO2015/119437
PCT Pub. Date: Aug. 13, 2015

(65) Prior Publication Data
US 2016/0349798 A1  Dec. 1, 2016

(30) Foreign Application Priority Data
Feb. 5, 2014 (KR) .................. 10-2014-0012868

(51) Int. Cl.
  *G06F 1/16* (2006.01)
  *G06F 3/041* (2006.01)
  *G06F 3/044* (2006.01)

(52) U.S. Cl.
  CPC .......... *G06F 1/1643* (2013.01); *G06F 1/1626* (2013.01); *G06F 1/1637* (2013.01);
  (Continued)

(58) Field of Classification Search
  CPC .... G06F 1/1643; G06F 1/1626; G06F 1/1637; G06F 3/0412; G06F 3/0418; G06F 3/044; G06F 2203/04103; G06F 2203/04107
  See application file for complete search history.

(56) References Cited

U.S. PATENT DOCUMENTS

2011/0012841 A1    1/2011  Lin
2012/0103777 A1*   5/2012  Kang ............... G06F 3/044
                                                      200/600
(Continued)

FOREIGN PATENT DOCUMENTS

KR    10-2009-0110770    10/2009
KR    10-2011-0095684    8/2011
(Continued)

OTHER PUBLICATIONS

International Search Report for International Patent Application No. PCT/KR2015/001182 dated May 19, 2015.

*Primary Examiner* — Lixi C Simpson
(74) *Attorney, Agent, or Firm* — Kunzler Bean & Adamson

(57) ABSTRACT

Disclosed is a transparent cover for an electronic device capable of preventing malfunction of a capacitive touch screen and expressing a design characteristic of a unique texture. The transparent cover for the electronic device which covers a capacitive touch screen in the electronic device having the capacitive touch screen includes a transparent substrate, and a window decoration made of a metal material and formed on one surface of the transparent substrate, in which the window decoration includes a plurality of metal thin film figures which is electrically isolated from each other.

14 Claims, 10 Drawing Sheets

(52) U.S. Cl.
CPC ............ *G06F 3/044* (2013.01); *G06F 3/0412* (2013.01); *G06F 3/0418* (2013.01); *G06F 2203/04103* (2013.01); *G06F 2203/04107* (2013.01)

(56) References Cited

U.S. PATENT DOCUMENTS

| | | | | |
|---|---|---|---|---|
| 2013/0082961 A1* | 4/2013 | Wang | ...................... | G06F 3/044 345/173 |
| 2013/0320322 A1* | 12/2013 | Muto | .................. | H01L 51/0021 257/40 |
| 2014/0226086 A1* | 8/2014 | Chu | ........................ | G06F 3/044 349/12 |
| 2014/0233161 A1* | 8/2014 | Liu | ........................ | C03C 15/00 361/679.01 |
| 2015/0130763 A1* | 5/2015 | Park | ........................ | G06F 3/041 345/174 |
| 2015/0373844 A1* | 12/2015 | Yoon | ........................ | G06F 3/041 345/173 |
| 2016/0016845 A1* | 1/2016 | Cho | ........................ | C03C 15/00 428/157 |

FOREIGN PATENT DOCUMENTS

| | | |
|---|---|---|
| KR | 10-2012-0090500 | 8/2012 |
| KR | 10-2013-0083628 | 7/2013 |

\* cited by examiner

[FIG. 1]
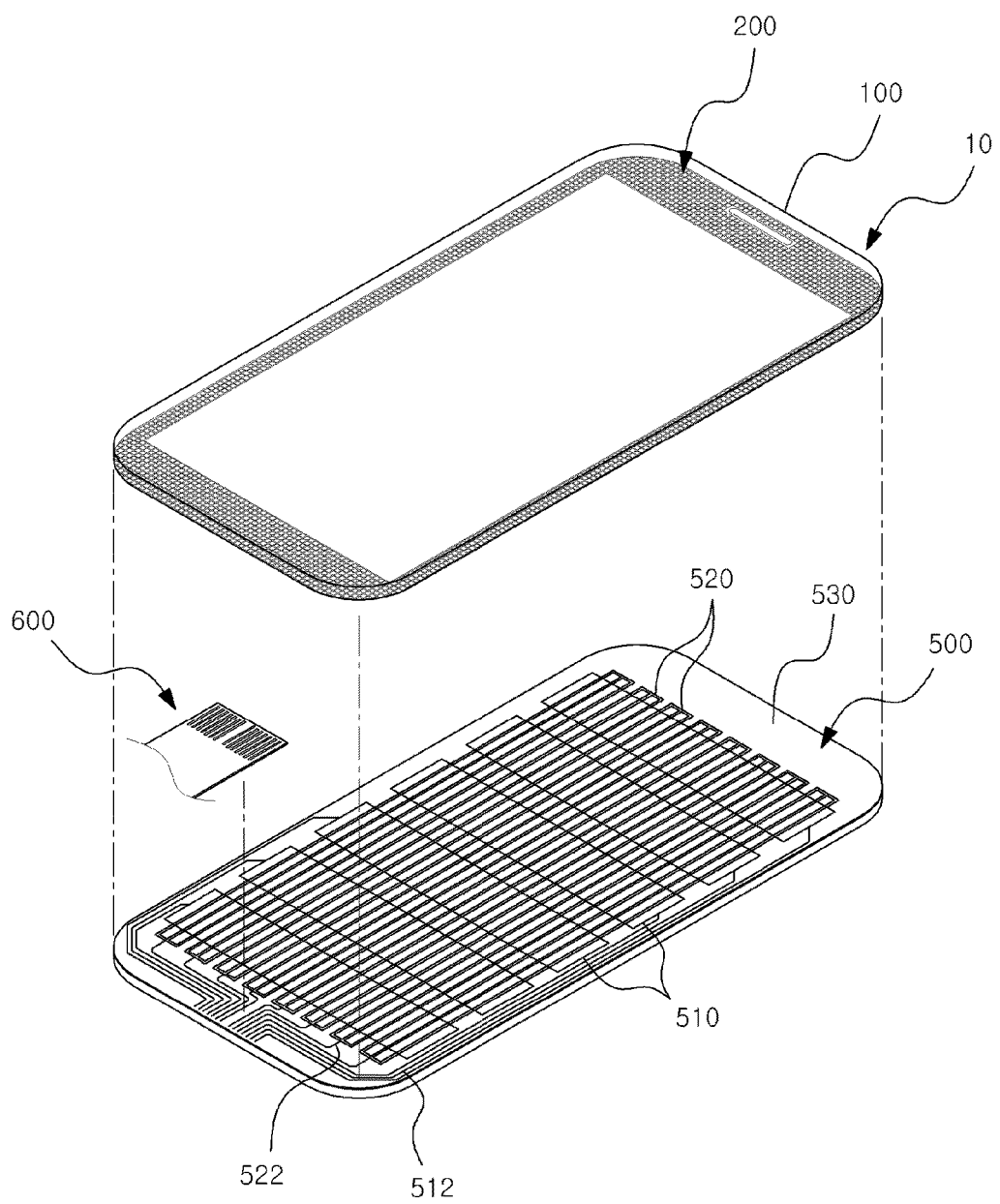

[FIG. 2]
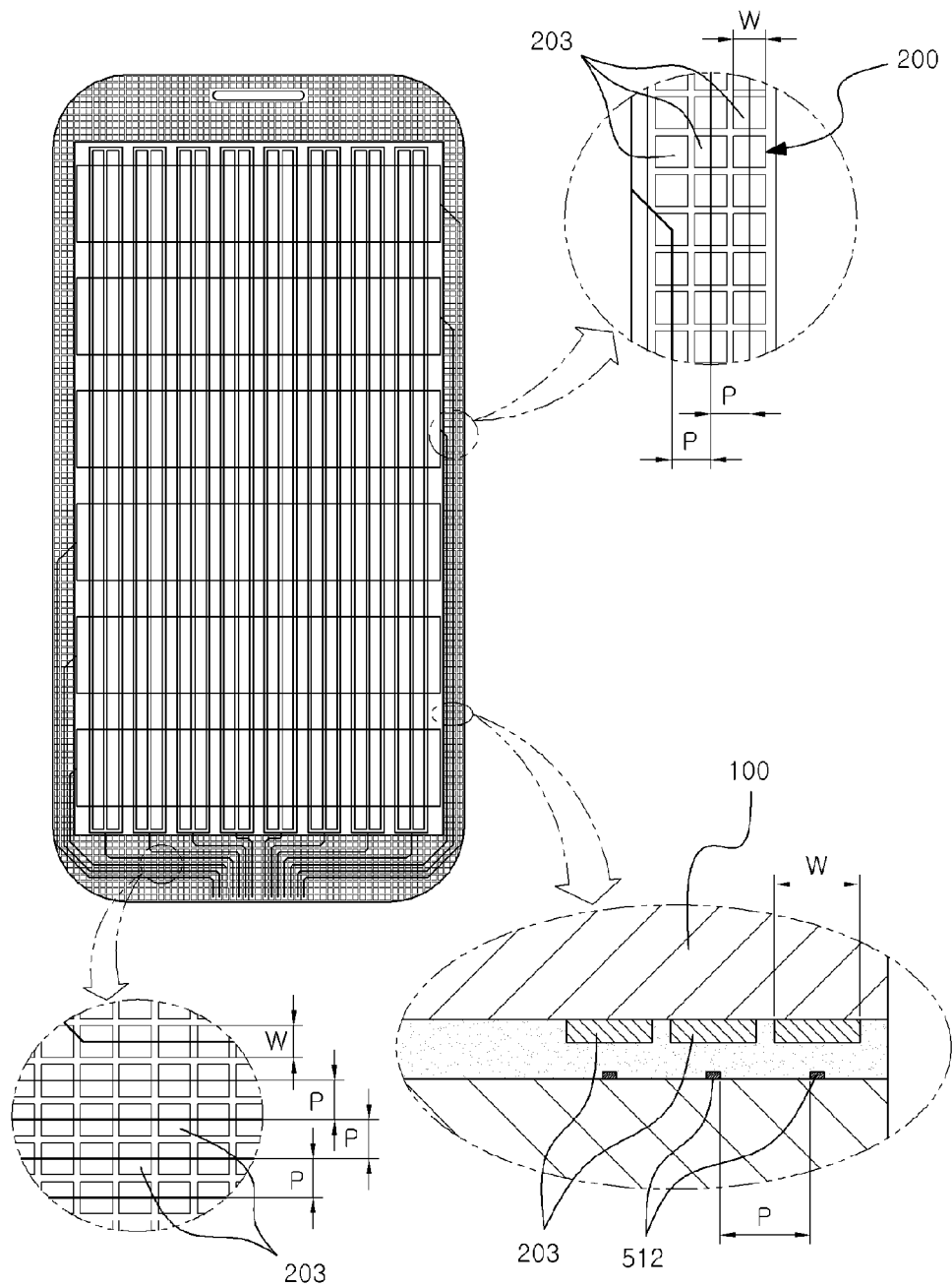

[FIG. 3]
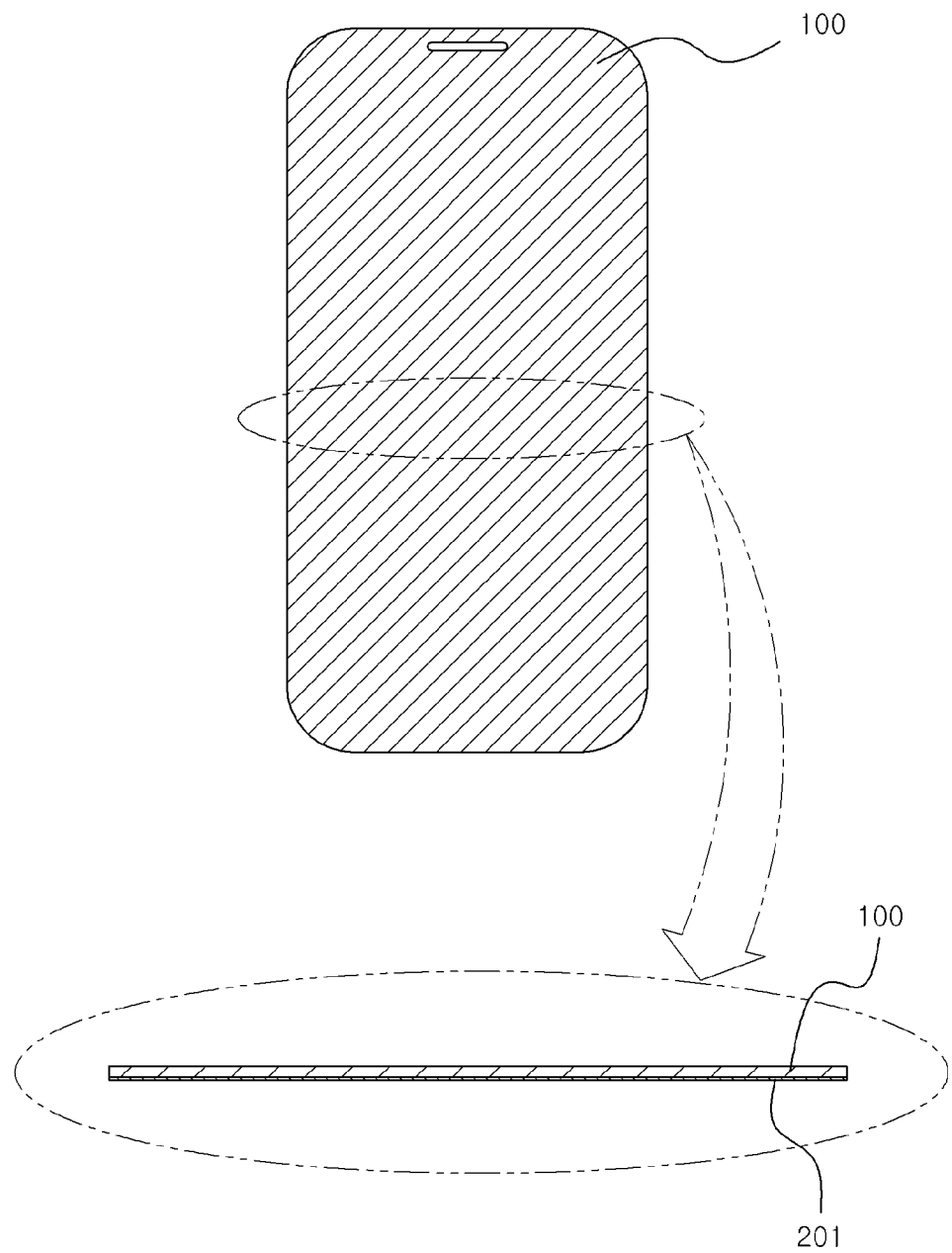

[FIG. 4]
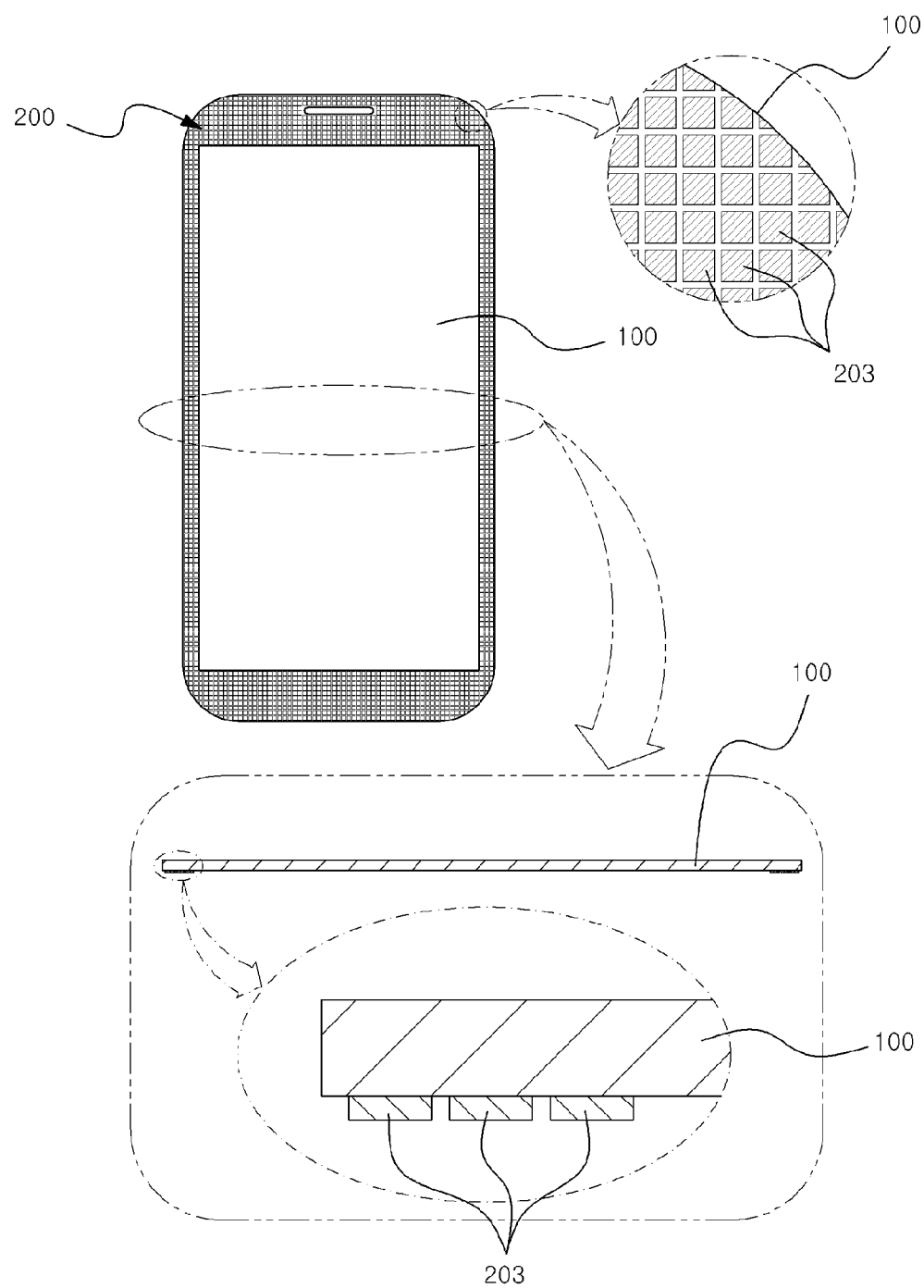

[FIG. 5]
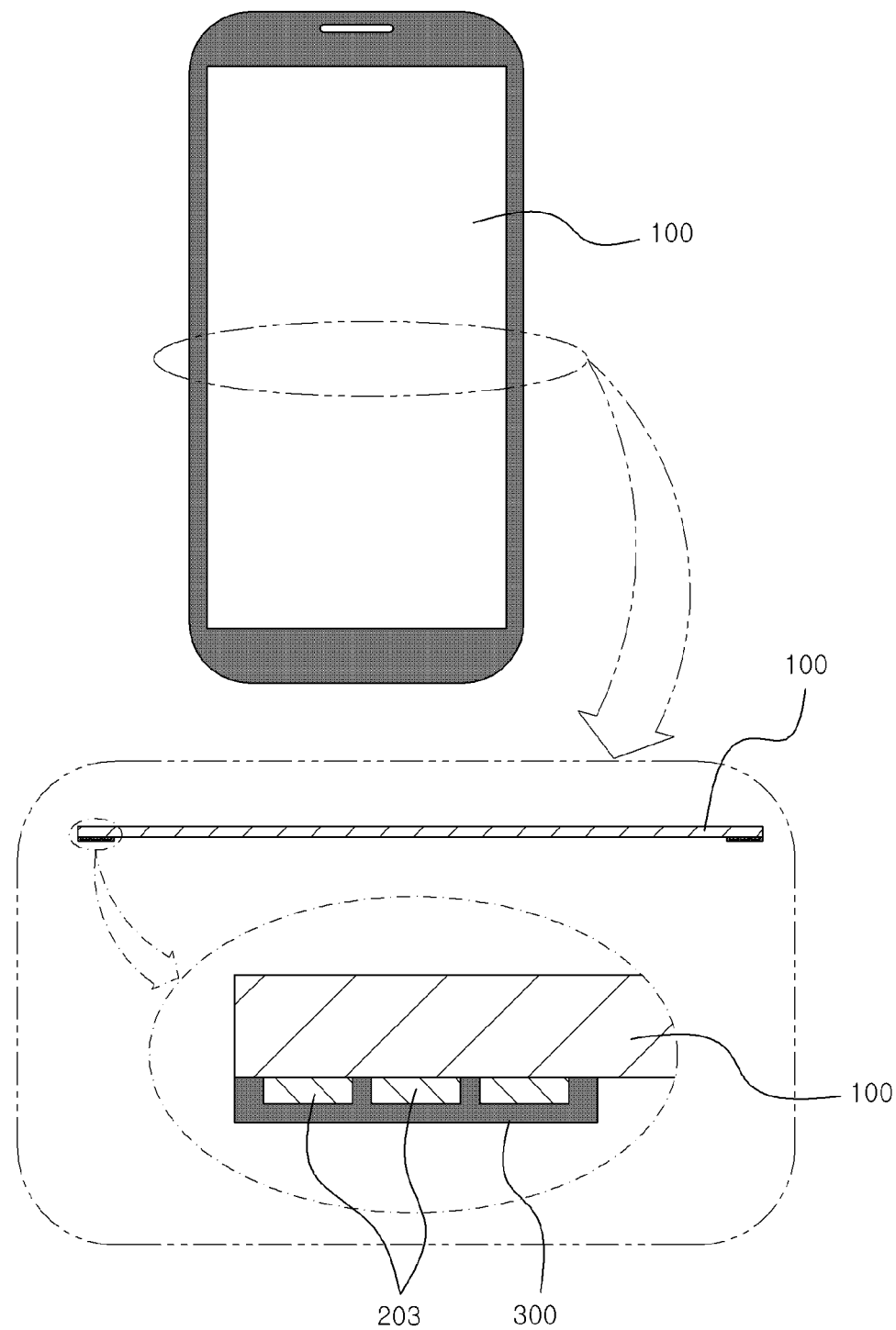

[FIG. 6]
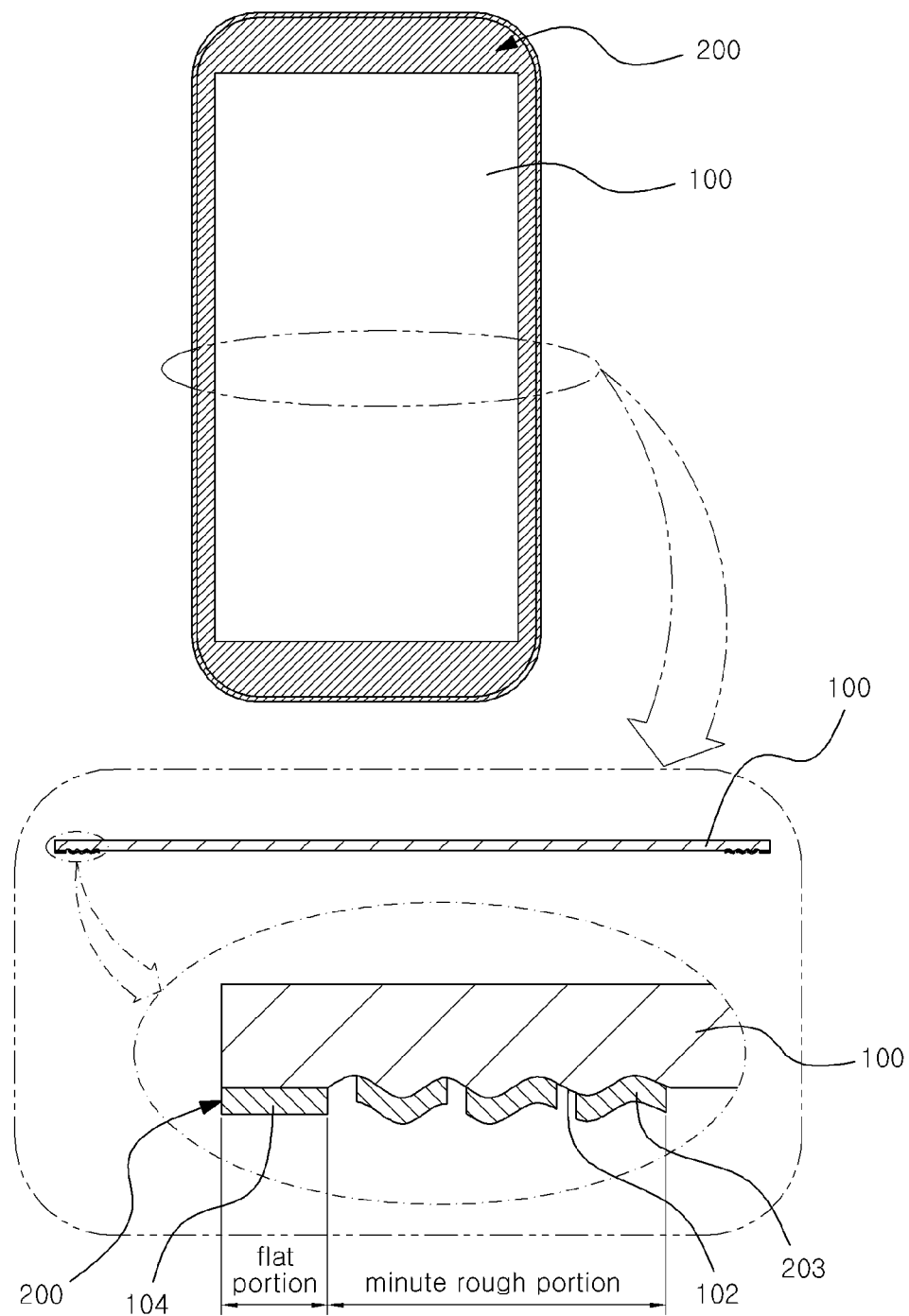

[FIG. 7]
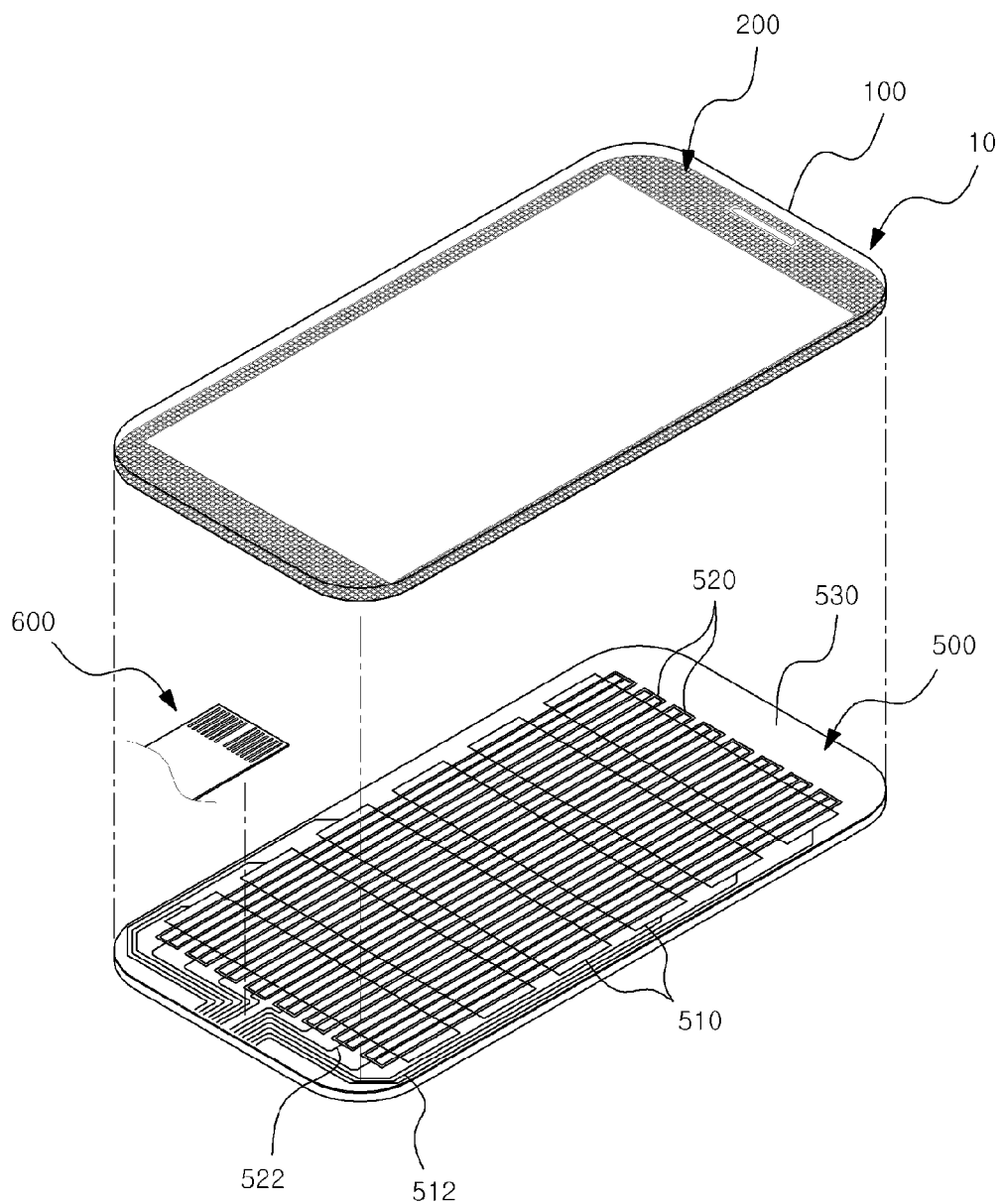

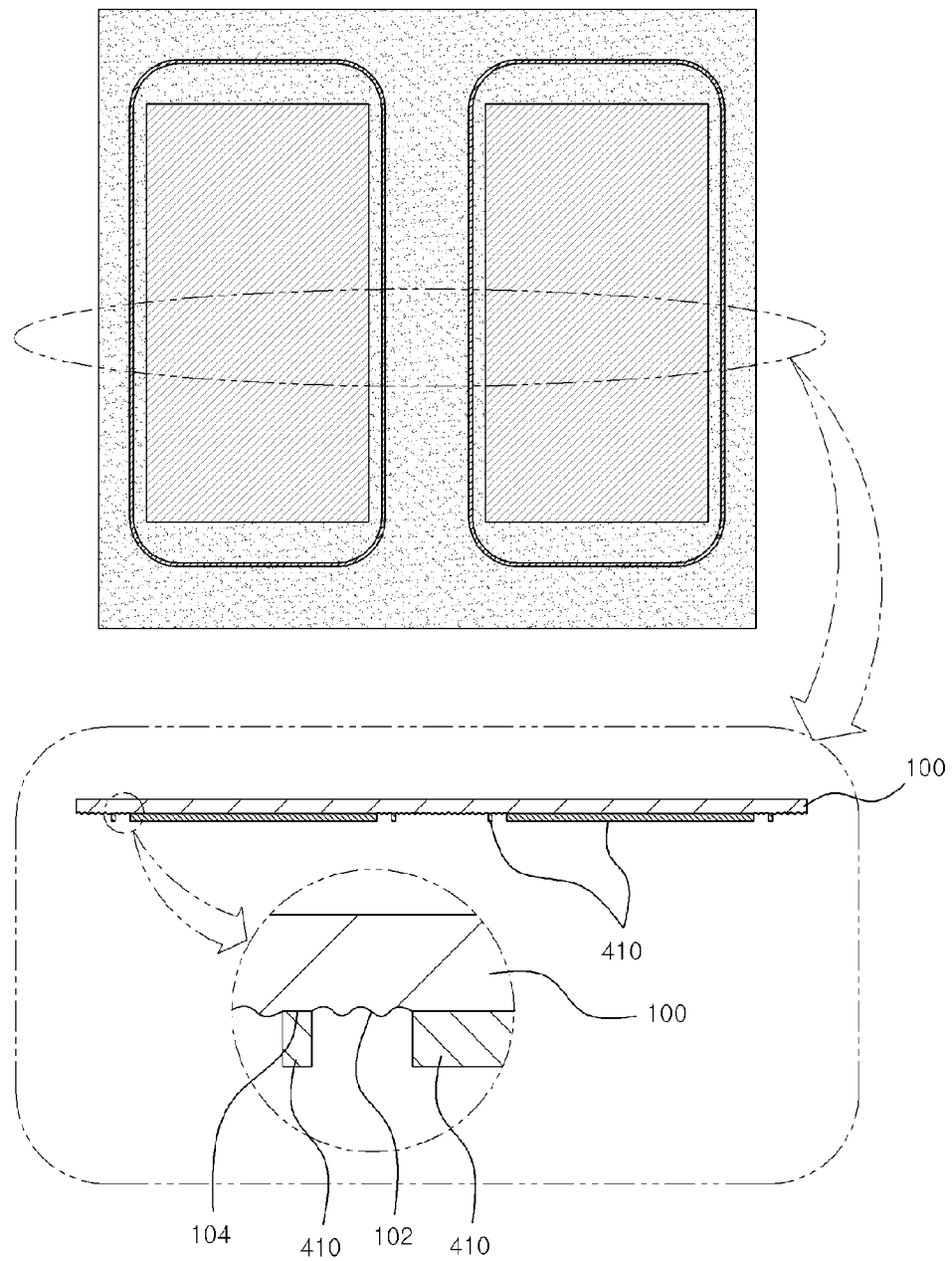
[FIG. 8]

[FIG. 9]
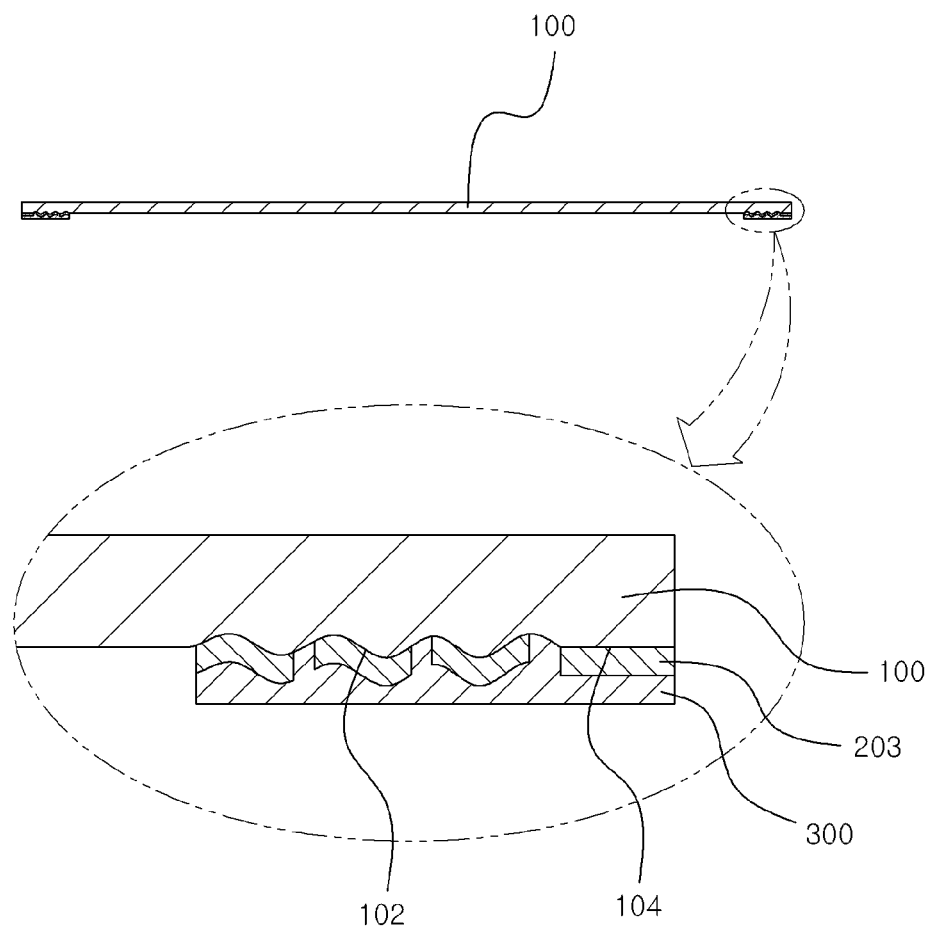

[FIG. 10]
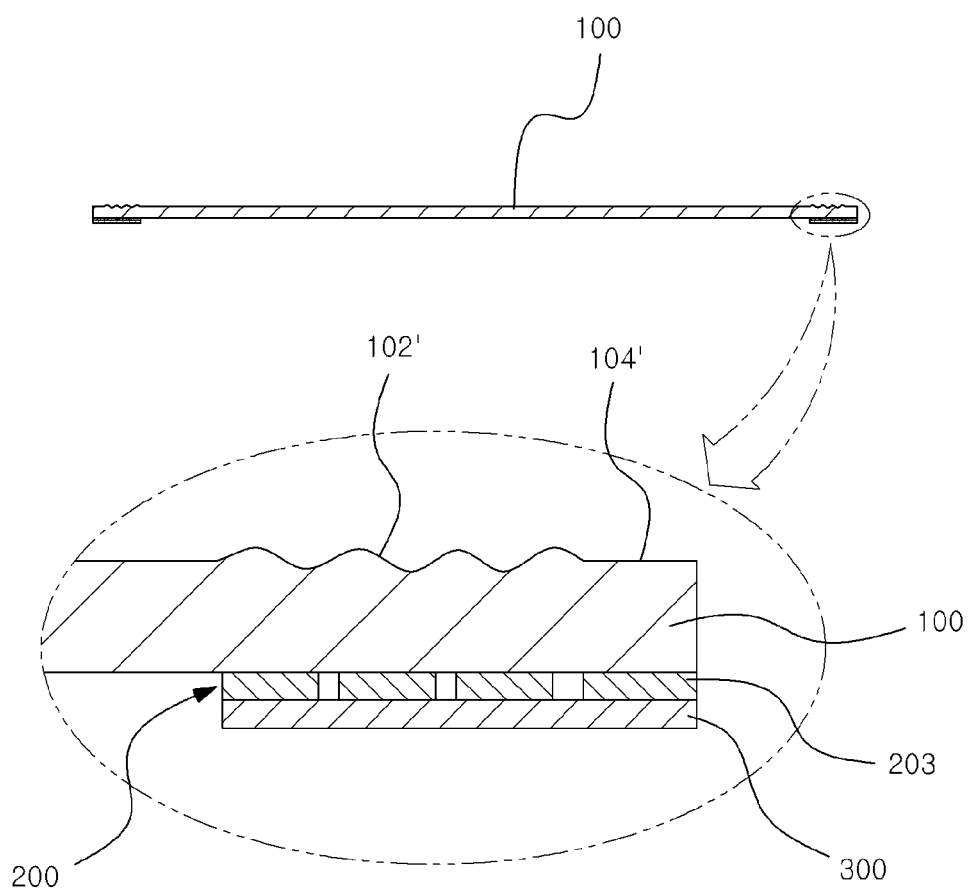

TRANSPARENT COVER FOR ELECTRONIC DEVICE

TECHNICAL FIELD

The present invention relates to a transparent cover for an electronic device, and more particularly, to a transparent cover for an electronic device with a metallic window decoration, which can prevent malfunction of a touch screen. The present invention was supported by the Ministry of Trade, Industry and Energy (MOTIE) of Republic of Korea and the Korean Evaluation Institute of Industrial Technology (KEIT) through the Materials and Components Technology Development Program (Grant No. 10062220) in the project name of "Development of Stretchable Transparent Electrode Film with 3 μm Line Space Based on Cu/Ag Composite Nanoparticles".

BACKGROUND ART

In general, a transparent cover is attached onto a front surface of a touch screen of an apparatus with the touch screen among electronic devices, for example, a smart phone, a tablet, a notebook, and a monitor, and the like with the touch screen.

Further, a window decoration can be formed on the edge of the transparent cover. The window decoration can be provided for a purpose of covering an opaque component disposed therebelow, for example, a wire member (not illustrated) and a circuit board (not illustrated) disposed on the edge of a touch panel sensor and formed by a general printing process, and the like.

Meanwhile, in recent years, the performance of the electronic device is also important, but an external design of the electronic device has also been important as much. As one example, according to a survey targeting purchasers, it is revealed that a just 'design' is first considered when purchasing a product. The external design of the product exerts a large influence on purchasing the product as much.

The window decoration can play a basic role of covering the opaque component disposed therebelow and express the external design of the electronic device. To this end, in recent years, a material of the window decoration which can show a unique design effect has been reviewed so as to meet needs of a consumer which have been rapidly changed.

As one example, in recent years, various attempts for forming the window decoration by color printing or by new materials such as oxide multi-coating have been made.

Meanwhile, when as the material of the window decoration, a metallic material is used, a unique design characteristic having a metallic texture can be expressed by using the window decoration. However, when the window decoration is made of the metallic material, malfunction of the touch screen is caused due to a unique electrical characteristic of metal.

In particular, when the window decoration made of the metal material is used, in the case where a touch operation is performed on an edge portion of an capacitive touch screen adjacent to the window decoration, it is difficult to accurately sense the touch operation of the capacitive touch screen due to an electrical influence of the window decoration and an unintended malfunction is caused.

Further, since a plurality of wire members transferring a touch signal of the capacitive touch screen is disposed below the metallic window decoration, even when the touch operation is performed not on the edge but at the center of the capacitive touch screen, when a signal by the touch operation is transferred along a specific wire member, interference may occur due to the electrical characteristic of the window decoration or the signal is transferred to another unintended wire member, and as a result, the malfunction may occur.

Therefore, in recent years, various reviews for the window decoration capable of preventing the malfunction of the touch screen and showing the unique design characteristic have been performed, but the window decoration has yet not been insufficient, and as a result, development of the window decoration have been required.

DESCRIPTION

Technical Problem

The present invention has been made in an effort to provide a transparent cover for an electronic device which can prevent malfunction of a touch screen and show a design characteristic having a unique texture.

In particular, the present invention has been made in an effort to provide a transparent cover for an electronic device with a window decoration, which can show a design characteristic having a metallic texture by using a metallic material and prevent malfunction of a capacitive touch screen.

Further, the present invention has been made in an effort to provide a transparent cover for an electronic device which can prevent reflection of light caused by a metallic window decoration and prevent damage of the transparent substrate by forming a minute rough portion and a flat portion on the transparent substrate.

In addition, the present invention has been made in an effort to provide a transparent cover for an electronic device which can prevent malfunction of a capacitive touch screen by preventing charged from being accumulated in a metallic window decoration.

Moreover, the present invention has been made in an effort to provide a transparent cover for an electronic device which can improve a window decoration effect by forming a window decoration in a multi-metal structure.

Besides, the present invention has been made in an effort to provide a transparent cover for an electronic device which can improve a commercial value, contribute to upgrading a product, and promote satisfaction of a consumer.

Technical Solution

An exemplary embodiment of the present invention provides a transparent cover for the electronic device which covers a capacitive touch screen in the electronic device having the capacitive touch screen includes a transparent substrate, and a metallic window decoration and formed on one surface of the transparent substrate, in which the window decoration includes a plurality of metal thin film figures which is electrically isolated from each other.

The window decoration may be formed by a plurality of metal thin film figures which is electrically isolated from each other. For reference, it may be understood that the metal thin film figure includes at least one of rectangular, round, oval and hairline shapes.

The shape of the metal thin film figure may be appropriately changed according to a required condition and a design specification. Preferably, the metal thin film figures may be provided with sizes capable of minimizing interference in the operation of the touch screen.

As an example, the plurality of metal thin film figures may be formed to have any one of a width, a horizontal length, a diameter, a long axis, or a short axis which is relatively smaller than a pitch interval which is an interval where signal lines of the touch screen are spaced apart from each other, and the signal lines of the touch screen may be disposed on different metal thin film figure regions which are electrically isolated from each other in each pitch interval direction. More particularly, the plurality of metal thin film figures may be formed to have any one of a width, a horizontal length, a diameter, a long axis, or a short axis within ½ of the pitch interval. The plurality of metal thin film figures may be formed to have sizes of 0.1 μm to 0.5 mm. Due to such a structure, different signal lines may be disposed in the metal thin film figures which are electrically isolated from each other at the pitch interval to prevent the interference caused by the metal thin film figures made of metal materials. The minute rough portion corresponding to the window decoration may be formed on the transparent substrate so that the window decoration is made of a metal material to prevent reflection (a reflective mirror effect) of light.

For reference, in the present invention, it may be understood that the minute rough portion corresponding to the window decoration is formed on the transparent substrate to be disposed in a region where the window decoration and the minute rough portion overlap with each other during planar projection.

The minute rough portion may be formed on one surface or the other surface of the transparent substrate according to a required condition and a design specification. As an example, the minute rough portion may be formed on the lower surface (one surface) of the transparent substrate, and the window decoration may be formed on one surface of the transparent substrate to cover the minute rough portion. Unlike this, the window decoration may be formed on the lower surface of the transparent substrate, and the minute rough portion may be formed on the upper surface of the transparent substrate.

Further, a non-processed flat portion may be provided between the outermost edge of the transparent substrate and the minute rough portion. Herein, it may be understood that the flat portion is a flat portion in which the minute rough portion is not formed (processed). When the minute rough portion is formed up to the outermost edge of the transparent substrate, glass may be broken and cracks may occur at the outermost edge of the transparent substrate due to a characteristic of the glass. To this end, in the present invention, the non-processed flat portion may be provided to the edge portion (the outermost edge) of the transparent substrate 100 which is relatively weak to prevent the damage and the cracks of the transparent substrate.

Further, the transparent cover for the electronic device may further include a printing layer formed on the lower surface of the window decoration. The printing layer may show a light leakage effect and a new design effect through a texture difference from the metal thin film figures.

Furthermore, the printing layer may be formed of an electrically conductive material, and preferably, the printing layer may be formed of a high-resistance material which has a specific resistance larger than 1 Ωcm so as to prevent the capacitance from being accumulated in the metal thin film figures through the printing layer. Further, the printing layer may be connected to the ground of the electronic device so as to the capacitance accumulated in the printing layer is discharged.

Advantageous Effects

According to the exemplary embodiments of the present invention, it is possible to prevent malfunction of a touch screen while expressing a design characteristic of a metal texture by using a window decoration including a plurality of metal thin film figures.

In particular, it is possible to prevent interference caused by a metal characteristic and malfunction caused by mistransmission of a signal while expressing a luxurious design characteristic of a metal texture by using a plurality of metal thin film figures which is electrically isolated from each other as a window decoration. Further, it is possible to prevent reflection (a reflective mirror effect) of light caused when the window decoration is formed of a metal material, by forming minute rough portion on the transparent substrate.

Further, it is possible to minimize reflection of light caused by the window decoration by forming the minute rough portion and the metal-made window decoration on different surfaces of the transparent substrate and allowing light incident to the transparent substrate to pass through the minute rough portion and be first scattered.

Furthermore, it is possible to prevent the damage and cracks of an edge portion (outermost edge) of the transparent substrate which is relatively weak, by providing a non-processed flat portion between the outermost edge of the transparent substrate and the minute rough portion.

Further, it is possible to express a luxurious unique design effect by reflecting the light at the outermost edge portion of the transparent substrate and scattering the light at the inner edge portion because the minute rough portion serving as a scattering layer where the light is scattered and the flat portion serving as a mirror surface where the light is reflected coexist on the transparent substrate.

Further, it is possible to prevent malfunction of the touch screen caused by when charges are accumulated in the metallic window decoration by forming a high-resistance printing layer so as to cover the window decoration. Furthermore, it is possible to prevent malfunction of the touch screen by capacitance so as to flow capacitance accumulated through the printing layer to the ground.

Further, it is possible to more improve a window decoration effect by forming the window decoration as a multilayered metal structure.

Further, it is possible to improve a design characteristic and a product value. Therefore, it is possible to contribute to the advanced product and provide satisfaction for consumers.

BRIEF DESCRIPTION OF THE DRAWINGS

FIG. 1 is a diagram for describing a transparent cover for an electronic device according to an exemplary embodiment of the present invention.

FIG. 2 is a diagram for describing a window decoration as the transparent cover for the electronic device according to the exemplary embodiment of the present invention.

FIGS. 3 to 5 are diagrams for describing a manufacturing method of a transparent cover for an electronic device according to an exemplary embodiment of the present invention.

FIG. 6 is a diagram for describing a transparent cover for an electronic device according to another exemplary embodiment of the present invention.

FIGS. 7 to 9 are diagrams for describing a manufacturing method of a transparent cover for an electronic device according to another exemplary embodiment of the present invention.

FIG. 10 is a diagram for describing a transparent cover for an electronic device according to yet another exemplary embodiment of the present invention.

MODES OF THE INVENTION

Hereinafter, exemplary embodiments of the present invention will be described in detail with reference to the accompanying drawings, but the present invention is not limited by the exemplary embodiments. For reference, in the present invention, like reference numerals designate substantially like constituent elements, the contents disclosed in different drawings under the rule can be cited and described, and the contents which are determined to be apparent to those skilled in the art or repeated can be omitted.

FIG. 1 is a diagram for describing a transparent cover for an electronic device according to an exemplary embodiment of the present invention, and FIG. 2 is a diagram for describing a window decoration as the transparent cover for the electronic device according to the exemplary embodiment of the present invention. Further, FIGS. 3 to 5 are diagrams for describing a manufacturing method of a transparent cover for an electronic device according to another exemplary embodiment of the present invention.

Referring to FIGS. 1 and 2, a transparent cover 10 for an electronic device according to the present invention includes a transparent substrate 100 and a window decoration 200.

For reference, in the present invention, the electronic device may includes a smart phones, tablets, smart watches, laptop computers, monitors, and the like having a capacitive touch screen 500, and the present invention is not limited by types and characteristics of electronic devices.

The transparent cover 10 is installed on the front surface of the touch screen 500, and the window decoration 200 is formed at the edge portion of the transparent cover 10 to be used for covering a wire member (not illustrated) and a circuit board (not illustrated) which are disposed at the edge of the touch screen 500.

For reference, in the present invention, a general capacitive touch screen 500 capable of detecting capacitively touch manipulation as the touch screen 500. As an example, the capacitive touch screen 500 may be constituted by including a transmitter line 510 and a receiver line 520 which are disposed in a laminated structure, and the signals of the electrodes 510 and 520 may be transferred through signal wires 512 and 522 which are connected to the respective electrodes. For reference, the transmitter line 510 and the receiver line 520 may be provided as a structure using a single or a plurality of films or coating layers, and the present invention is limited by the laminated structure of each electrode. In other words, each electrode may be formed with a general laminated structure on a single film (coating layer) or different films (coating layers).

The transparent substrate 100 may be formed of general glass, reinforced glass, or sapphire. If necessary, as the transparent substrate, a reinforced plastic such as polycarbonate having transparency and excellent strength may be used. For reference, the transparent substrate may be disposed on the front surface of the touch screen to be directly exposed to the outside, but if necessary, other substrates may be laminated on the front surface of the transparent substrate.

The window decoration 200 is made of a metal material and formed on one surface of the transparent substrate 100. Herein, one surface of the transparent substrate 100 may be understood as a meaning of including both the lower surface of the transparent substrate 100 and the upper surface of the transparent substrate 100. Hereinafter, an example in which the window decoration 200 is formed on the lower surface of the transparent substrate 100 will be described.

More particularly, the window decoration 200 is formed by a plurality of metal thin film figures 203 which is electrically isolated from each other. For reference, the metal thin film figure 203 may be understood as a meaning of including at least one form among rectangular, round, oval and hairline shapes.

As such, in the present invention, it is possible to prevent interference caused by forming the window decoration 200 made of a metal material and malfunction caused by mistransmission of the signal while expressing a design characteristic of a metal texture through the window decoration 200, by forming the window decoration 200 consisting of the plurality of metal thin film figures 203 which is electrically isolated from each other.

Hereinafter, a manufacturing method of a transparent cover 10 for an electronic device according to another exemplary embodiment of the present invention will be described with reference to FIGS. 3 to 5.

The manufacturing method of the transparent cover 10 for the electronic device having a capacitive touch screen 500 according to the present invention includes providing a transparent substrate 100, and forming a window decoration 200 made of a metal material on one surface of the transparent substrate 100, in which the window decoration 200 includes a plurality of metal thin film figures 203 which is electrically isolated from each other.

The window decoration 200 including the metal thin film figures 203 may be formed by various methods according to a required condition.

As an example, referring to FIG. 3, first, the metal thin film figures 203 may be formed by providing the transparent substrate 100, forming a metal thin film layer 201 on the transparent substrate 100, and then partially removing the metal thin film layer 201.

The metal thin film layer 201 may be formed on the surface of the transparent substrate 100 by a general method such as heat deposition, e-beam deposition, and sputtering, and the present invention is not limited by a type and a characteristic of the material for forming the metal thin film layer 201. As an example, the metal thin film layer 201 may be formed by a single-layer or multilayer structure by using at least one of chromium, aluminum, tin, palladium, molybdenum, and copper. Preferably, the metal thin film layer 201 may be formed with a thickness of 10 to 500 nm.

In some cases, before forming the metal thin film layer, an oxide thin film layer such as alumina ($Al_2O_3$), silicon dioxide ($SiO_2$), and titanium dioxide ($TiO_2$) is coated on the surface of the transparent substrate, and then a metal thin film layer may be formed on the surface of the oxide thin film.

In the aforementioned and illustrated exemplary embodiment of the present invention, an example in which the metal thin film layer 201 is formed by the single metal layer is described, but in some cases, the metal thin film layer may be provided by a multilayer structure made of different or similar materials, and the metal thin film figures formed by removing the metal thin film layer may also be provided by a multilayer metal structure.

Thereafter, after a mask layer (not illustrated) is formed on the surface of the metal thin film layer 201, the metal thin film layer 201 is partially etched by using the mask layer to form the plurality of metal thin film figures 203 which is isolated from each other, as illustrated in FIG. 4. For reference, the forming of the plurality of metal thin film figures 203 may be formed by a general photolithography process. Further, when the metal thin film figures 203 are formed, a screen region may be etched together. The plurality of metal thin film figures 203 may be spaced apart from each other to correspond to the mask layer in an etching process, and the metal thin film figures 203 may be spaced apart from each other to be electrically isolated from each other. By such a structure, the metal thin film figures 203 may be electrically isolated from each other to prevent a wireless signal of the touch screen 500 from being transferred to another adjacent signal through the metal thin film figures 203.

For reference, in the present invention, an example in which the metal thin film figures 203 have rectangular shapes will be described. In some cases, the metal thin film figures may be formed in other different polygonal shapes such as triangle and hexagon or formed in shapes such as a circular, oval, or atypical shape, and unlike this, the metal thin film figures may be formed in hairline shapes.

Meanwhile, the shape of the metal thin film figure 203 may be appropriately changed according to a required condition and a design specification. Preferably, the metal thin film figures 203 may be provided with sizes capable of minimizing interference in a touch panel sensor.

Preferably, referring to FIG. 2, the plurality of metal thin film figure 203 is formed to have relatively small sizes than a pitch interval which is a separation interval between signal lines (for example, 512) of the touch screen, and the signal lines (for example, 512) of the touch screen may be disposed on a region of different metal thin film figure which are electrically isolated from each other in the pitch interval direction. In other words, different signal lines may be disposed in the metal thin film figures which are electrically isolated from each other at the pitch interval to prevent the interference caused by the metal thin film figures made of metal materials.

Herein, the fact that the metal thin film figures have relatively smaller sizes than the pitch intervals between the signal liens of the touch screen may be understood as the fact that a horizontal length W (alternatively, a width, a horizontal length, a diameter, a long axis, and a short axis) of the metal thin film figure has a relatively smaller size (P>W) than a separation interval between any one adjacent signal line and the other signal line. On the other hand, a vertical length (a length in a perpendicular direction to the pitch interval direction) of the metal thin film figure may be provided with various sizes regardless of the pitch interval between the signal lines.

Preferably, in order to prevent signal interference of the touch screen 500, the size of the metal thin film figure 203 may be formed within ½ of a pitch P (a separation interval between wires) of the signal line of the touch screen 500. Generally, the metal thin film figure 203 having a size within approximately 1 mm may be used, but the size of the metal thin film figure 203 may be adjusted according to the separation interval (the pitch interval) of the signal line and other different conditions. If the pitch of the signal line (wire) of a bezel portion of the touch screen 500 is 0.2 mm, the metal thin film figure 203 may be formed to have a width, a horizontal length, a diameter, a long-axial length, and a short-axial length within approximately 0.1 mm. More preferably, the plurality of metal thin film figures may be formed to have sizes of 0.1 μm to 0.5 mm.

Meanwhile, referring to FIG. 5, the transparent cover 10 for the electronic device according to the present invention may include a printing layer 300 formed to cover the window decoration 200 on the lower surface of the window decoration 200. The printing layer 300 may show a light leakage effect and a new design effect through a texture difference from the metal thin film figures 203.

The printing layer 300 may be formed through a general silk screen printing method and the like and provided to have a thickness of approximately 5 to 20 mm.

Further, the capacitance may be prevented from being accumulated in the metal thin film figures 203 through the printing layer 300. To this end, the printing layer 300 may be formed of an electrically conductive material, and preferably, the printing layer 300 may be formed of a high-resistive material of which specific resistance is larger than 1 Ωcm.

For reference, the printing layer 300 may have electric conductivity by adding at least one of carbon powder, metal powder, and nano conductive powder to printing ink. In some cases, the printing layer may be constituted to have electric conductivity by other methods.

The printing layer 300 may be printed once or many times, and the formation conduction of the printing layer 300 may be appropriately changed according to a required condition and a design specification.

Meanwhile, generally, a specific resistance of the metal is $10(-7)$ Ωcm, whereas the printing layer 300 has very high resistance as the specific resistance of 1 Ωcm, as compared with a metal. The high-resistance printing layer 300 has a characteristic in which the capacitance is reduced and the signal of the touch screen 500 is not interfered.

Further, the printing layer 300 may be connected to the ground of the electronic device so that the capacitance accumulated in the printing layer 300 is discharged. As an example, the printing layer 300 may be connected to the ground of the electronic device through a general FPCB connection (see 600 of FIG. 1). Such a structure allows the capacitance accumulated in the printing layer 300 to flow to the ground of the electronic device to prevent malfunction of the touch screen 500 caused by the capacitance.

Meanwhile, FIG. 6 is a diagram for describing a transparent cover 10 for an electronic device according to another exemplary embodiment of the present invention and FIGS. 7 to 9 are diagrams for describing a manufacturing method of a transparent cover 10 for an electronic device according to another exemplary embodiment of the present invention. Further, FIG. 10 is a diagram for describing a transparent cover 10 for an electronic device according to yet another exemplary embodiment of the present invention. Furthermore, the same and equivalent portions as the aforementioned configurations designate the same and equivalent numeral references, and the detailed description therefor will be omitted.

Referring to FIGS. 6 to 9, the transparent cover 10 for the electronic device according to another exemplary embodiment of the present invention includes a transparent substrate 100 and a window decoration 200, and a minute rough portion 102 corresponding to the window decoration 200 may be formed on the transparent substrate 100.

The minute rough portion 102 may be formed for preventing reflection (a reflective mirror effect) of light caused by forming the window decoration 200 with a metal material.

For reference, in the present invention, it may be understood that the minute rough portion 102 corresponding to the window decoration 200 is formed on the transparent substrate 100 to be disposed in a region where the window decoration 200 and the minute rough portion 102 overlap with each other during planar projection.

The minute rough portion 102 may be formed on one surface or the other surface of the transparent substrate 100 according to a required condition and a design specification. As an example, the minute rough portion 102 may be formed on the lower surface (one surface) of the transparent substrate 100, and the window decoration 200 may be formed on one surface of the transparent substrate 100 to cover the minute rough portion 102.

The minute rough portion 102 may be formed by processing the surface of the transparent substrate 100 by using at least one processing method of sandblasting, etching, plasma etching, laser processing, and mechanical processing, and the present invention is not limited by the processing method of the minute rough portion 102. In some cases, without the surface processing of the transparent substrate, a scattering layer including micro beads is formed on the surface of the transparent substrate, and thus the scattering layer may serve as the minute rough portion. The scattering layer may be provided by mixing and curing the micro beads in a general resin such as a UV curable resin or ink.

Referring to FIG. 7, first, a masking pattern 410 is formed on the transparent substrate 100 through a printing or photomasking process and then as illustrated in FIG. 8, a portion without the masking pattern 410 is sandblasted to form the minute rough portion 102 having a size of 1 to 10 mm in a random shape. On the other hand, in the case of forming the minute rough portion 102 by laser processing, the minute rough portion 102 may be formed to have regular interval and size.

Furthermore, the portion with the minute rough portion 102 may show a dimly hazy effect together with a scattering effect in which the light is scattered. For reference, the transparent substrate 100 may be provided to correspond to at least one touch screen 500, and provided by cutting after forming the minute rough portion 102 and removing the masking pattern 410. Furthermore, when the transparent substrate 100 is reinforced glass, the transparent substrate 100 may be reinforced after the minute rough portion 102 is formed on the transparent substrate 100.

Further, a non-processed flat portion 104 may be provided between the outermost edge and the minute rough portion 102 of the transparent substrate 100. Herein, it may be understood that the flat portion 104 is a flat portion in which the minute rough portion 102 is not formed (processed).

When the aforementioned minute rough portion 102 is formed up to the outermost edge of the transparent substrate 100, glass is broken and cracks may occur at the outermost edge of the transparent substrate 100 due to a characteristic of the glass. Particularly, in the case of reinforced glass, the strength is high, but when the cracks occur at the edge portion, the glass is easily broken.

To this end, in the present invention, the non-processed flat portion 104 is provided to the edge portion (the outermost edge) of the transparent substrate 100 which is relatively weak to prevent the damage and the cracks of the transparent substrate 100. Preferably, the flat portion 104 may be provided to have a width within approximately 1 mm so as to minimizing reflection of the light through the flat portion 104 while preventing the damage of the transparent substrate 100.

The flat portion 104 may be provided by forming a masking pattern 410 at the portion corresponding to the flat portion 104 and removing the masking pattern 410 after forming the minute rough portion 102, when forming the masking pattern 410 for forming the aforementioned minute rough portion 102.

As such, according to the present invention, the minute rough portion 102 and the flat portion 104 are provided to the transparent substrate 100 to prevent the reflection of light caused by the window decoration 200 made of a metal material and simultaneously, prevent the damage of the transparent substrate 100.

Referring back to FIG. 6, after forming the minute rough portion 102, the window decoration 200 may be formed to cover simultaneously the minute rough portion 102 and the flat portion 104.

Further, referring to FIG. 9, after the minute rough portion 102 is formed to cover the minute rough portion 102 and the flat portion 104 of the transparent substrate 100, the printing layer 300 may be formed to cover the window decoration 200.

Meanwhile, in the exemplary embodiment of the present invention, an example in which the minute rough portion 102 and the flat portion 104 are formed on the same surface (the lower surface) of the transparent substrate is described, but in some cases, the minute rough portion and the window decoration may be constituted to be formed on opposite surfaces of the transparent substrate.

That is, referring to FIG. 10, the window decoration 200 may be formed on the lower surface of the transparent substrate 100, and a minute rough portion 102' and a flat portion 104' may be formed on the upper surface of the transparent substrate 100 corresponding to the window decoration 200. Similarly, the printing layer 300 may be formed below the window decoration 200 to cover the window decoration 200. In such a structure, light incident to the transparent substrate 100 may be first scattered by passing through the minute rough portion 102' to minimize the reflection of light caused by the window decoration 200.

Further, in the aforementioned and illustrated exemplary embodiment of the present invention, an example in which the window decoration 200 is directly formed on the surface of the transparent substrate 100 is described, but in some cases, after the window decoration is formed on a separate film member (for example, an anti-scattering film or a decoration film), the film member may be adhered to the transparent substrate. Further, unlike this, a coating layer made of a metal or any other materials may be formed to cover the window decoration.

The present invention has been described with reference to the preferred embodiments. However, it will be appreciated by those skilled in the art that various modifications and changes of the present invention can be made without departing from the spirit and the scope of the present invention which are defined in the appended claims and their equivalents.

The invention claimed is:

1. A transparent cover for an electronic device which covers a capacitive touch screen in the electronic device having the capacitive touch screen, wherein the capacitive touch screen comprises signal lines with each signal line being spaced apart from an adjacent signal line, in a first direction, by a pitch interval, the transparent cover comprising:

a transparent substrate; and a window decoration made of a metal material and formed on one surface of a portion of the transparent substrate, wherein the window decoration consists of a plurality of metal thin-film figures electrically isolated from each other, such that an entirety of the window decoration has the appearance of metal texture, wherein the portion of the transparent substrate on which the window decoration is formed comprises contoured surfaces configured to scatter light, prevent mirror reflection, and promote hazy gaps between the metallic thin-film figures such that the metal texture appears gapless, wherein each one of the plurality of metal thin-film figures has a width, in the first direction, that is smaller than the pitch interval, and wherein the metal thin-film figures of the plurality of metal thin-film figures are spaced apart from each other such that, when the transparent cover covers the capacitive touch screen, each one of the metal thin-film figures overlaps, in a second direction perpendicular to the first direction, a corresponding one of the signal lines.

2. The transparent cover of claim 1, wherein the plurality of metal thin film figures is formed in at least one shape of polygons, circles, ovals, and hairlines which are electrically separated from each other.

3. The transparent cover of claim 1, wherein the width is within ½ of the pitch interval.

4. The transparent cover of claim 1, wherein the plurality of metal thin film figures have sizes of 0.1 μm to 0.5 mm.

5. The transparent cover of claim 1, wherein the plurality of metal thin film figures have thicknesses of 10 to 500 nm.

6. The transparent cover of claim 1, wherein the plurality of metal thin film figures is provided by a single-layer or multilayer structure by using at least one of chromium, aluminum, tin, palladium, molybdenum, and copper.

7. The transparent cover of claim 1, wherein the contoured surfaces are formed on the one surface of the portion of the transparent substrate, and the window decoration is formed to cover the contoured surfaces on the one surface of the portion of the transparent substrate.

8. The transparent cover of claim 1, wherein the contoured surfaces are formed on a surface of the portion of the transparent substrate that is opposite the one surface of the portion of the transparent substrate.

9. The transparent cover of claim 1, wherein a flat portion is provided between the outermost edge of the transparent substrate and the contoured surfaces.

10. The transparent cover of claim 1, wherein the contoured surfaces are formed by processing the surface of the transparent substrate by using at least one processing method of sandblasting, etching, plasma etching, laser processing, and mechanical processing, or provided by forming a scattering layer including micro beads on the surface of the transparent substrate.

11. The transparent cover of claim 1, further comprising:
a printing layer formed on the lower surface of the window decoration.

12. The transparent cover of claim 11, wherein the printing layer is formed of an electrically conductive material.

13. The transparent cover of claim 12, wherein the printing layer has a specific resistance which is larger than 1 Ωcm.

14. The transparent cover of claim 12, wherein the printing layer is connected to the ground of the electronic device.

* * * * *